(12) United States Patent
Inukai et al.

(10) Patent No.: US 7,499,292 B2
(45) Date of Patent: Mar. 3, 2009

(54) POWER DEVICE AND POWER ADJUSTING METHOD

(75) Inventors: Katsumi Inukai, Iwakura (JP);
Hiroyuki Naganawa, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 277 days.

(21) Appl. No.: 11/483,703

(22) Filed: Jul. 11, 2006

(65) Prior Publication Data

US 2007/0008746 A1 Jan. 11, 2007

(30) Foreign Application Priority Data

Jul. 11, 2005 (JP) ............... 2005-201661

(51) Int. Cl.
*H02M 3/335* (2006.01)
(52) U.S. Cl. .................... 363/20; 323/283
(58) Field of Classification Search .......... 363/19, 363/20, 21, 21.01, 21.09, 25, 28, 34, 35, 363/16, 17; 323/266, 283, 284
See application file for complete search history.

(56) References Cited

U.S. PATENT DOCUMENTS

| 3,748,556 | A | * | 7/1973 | Gillett ..................... 363/34 |
| 4,661,896 | A | * | 4/1987 | Kobayashi et al. .......... 363/24 |
| 4,937,728 | A | * | 6/1990 | Leonardi .................. 363/97 |
| 5,023,517 | A | * | 6/1991 | Husak .................... 315/200 A |
| 5,029,269 | A | * | 7/1991 | Elliott et al. ............... 363/21.1 |
| 6,445,598 | B1 | * | 9/2002 | Yamada ................... 363/21.12 |
| 6,781,852 | B2 | * | 8/2004 | Hatta et al. ................... 363/17 |
| 2003/0074037 | A1 | * | 4/2003 | Moore et al. ................. 607/63 |
| 2003/0103360 | A1 | * | 6/2003 | Hatta et al. ................... 363/17 |
| 2003/0142513 | A1 | * | 7/2003 | Vinciarelli ................... 363/17 |
| 2004/0074900 | A1 | * | 4/2004 | Suenaga et al. ............ 219/600 |

FOREIGN PATENT DOCUMENTS

| JP | 10-091258 | 4/1998 |
| JP | 2002-165450 | 6/2002 |
| JP | 2002-262566 | 9/2002 |
| JP | 2005-039905 | 2/2005 |

* cited by examiner

*Primary Examiner*—Akm E Ullah
*Assistant Examiner*—M'Baye Diao
(74) *Attorney, Agent, or Firm*—Banner & Witcoff, Ltd

(57) ABSTRACT

A power device includes a transformer, a control signal outputting unit, and a power adjusting unit. The transformer has a primary coil and a secondary coil. The control signal outputting unit variably controls a parameter value and outputs, based on the parameter value, a control signal for controlling output power from the secondary coil. The power adjusting unit receives the control signal from the control signal outputting unit and adjusts power supplied to the primary coil based on the control signal. The power adjusting unit modifies a rate of change within a range in which the parameter value can be variably controlled, the rate of change being a rate of change in the power supplied to the primary coil with respect to the parameter value.

12 Claims, 10 Drawing Sheets

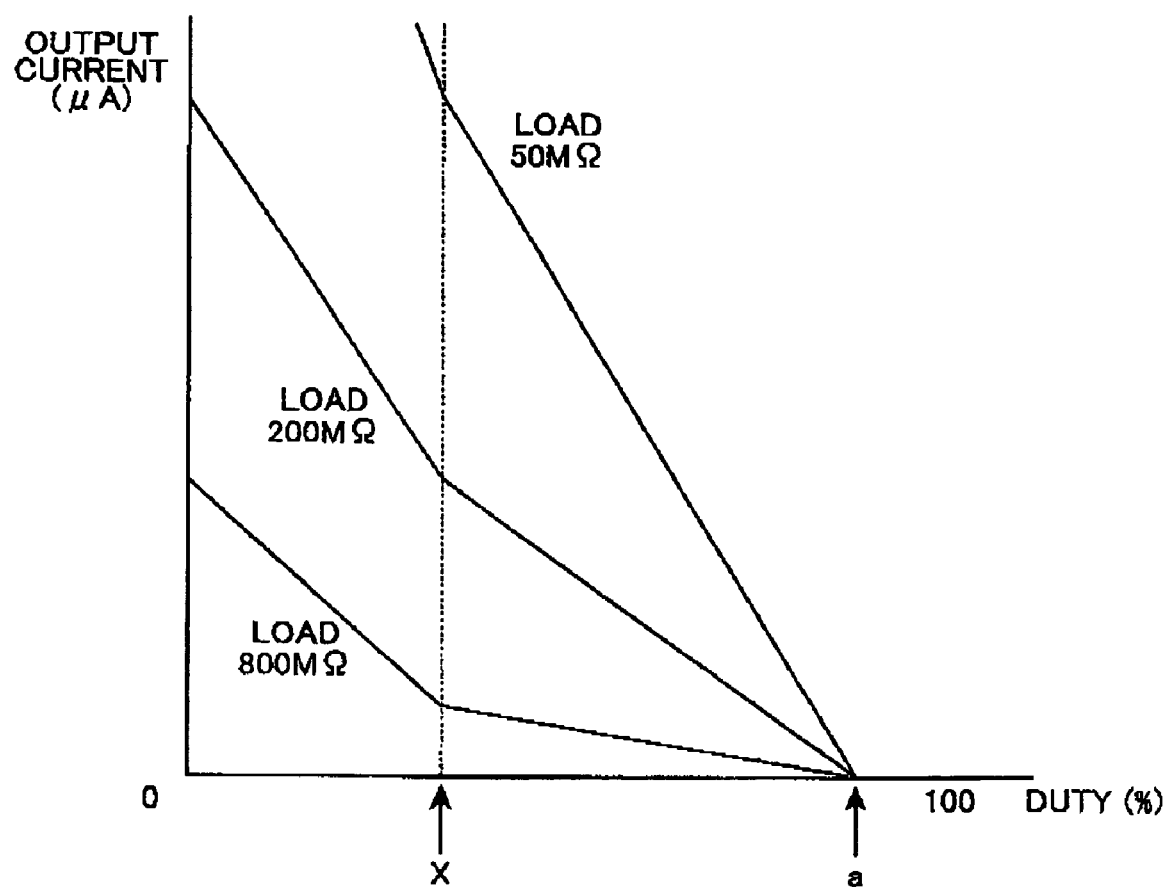

POWER DEVICE AND POWER ADJUSTING METHOD

CROSS REFERENCE TO RELATED APPLICATIONS

This application claims priority from Japanese Patent Application No. 2005-201661 filed Jul. 11, 2005. The entire content of the priority application is incorporated herein by reference.

TECHNICAL FIELD

The disclosure relates to a power device and a power adjusting method employing a transformer.

BACKGROUND

Common conventional image forming apparatuses employing an electrophotographic process, such as laser printers, copiers, and facsimile machines, form electrostatic latent images on a photosensitive member by charging the surface of the photosensitive member with a Scorotron charger or other charging device and exposing the charged surface of the photosensitive member to a scanned laser beam based on predetermined image data. Next, the image forming apparatus develops the electrostatic latent image with a developer unit, including a developer cartridge or the like for depositing toner or other developer on the surface of the photosensitive member, and transfers the developed image onto a recording medium, such as paper, with a transfer roller or other transfer unit to form an image on the recording medium.

The processes described above require a power device for supplying power of a predetermined high voltage to each of the charging device, developing unit, transfer unit, and the like, Japanese Patent Application Publication No. 10-91258 discloses one conventional method employed in a high-voltage power device for achieving the above-mentioned power supply. This method involves outputting a pulse width modulation (PWM) signal to a switch element connected in series to the primary side of a transformer, feeding back the output voltage produced on the secondary side of the transformer, performing an arithmetic operation on the output voltage by making use of the linearity of the duty-output characteristics of the transformer, and modifying the duty of the PWM signal to achieve the target output voltage. This method can produce an output voltage over a wide range using a single transformer.

SUMMARY

However, the conventional power device described above has difficulty controlling output when the load impedance is low, since the power device output changes greatly in response to duty changes in the PWM signal. Further, if the load impedance is high, the conventional power device cannot secure sufficient output, even when the duty is set to produce the maximum output.

These problems are illustrated in FIG. 1. FIG. 1 is a graph showing sample duty-output characteristics in a conventional power device. In this example, the power device is configured to increase output as the duty is decreased.

As shown in FIG. 1, a large output can easily be obtained when the load is 50 MΩ. However, a suitable output is difficult to obtain because the output changes greatly in response to minimum changes in the duty; that is, the output has a low resolution.

On the other hand, changes in output are small in response to changes in the duty when the load is 800 MΩ. Accordingly, it is easy to obtain the desired output in this case, but the tradeoff is that a large output cannot be obtained.

A particular problem when transferring a developer image onto a recording paper with a transfer unit in the image forming apparatus is that the load impedance changes over a broad range due to environmental factors, such as temperature and humidity, the thickness of the recording paper, and the like. Moreover, the transfer current supplied to the transfer unit must be increased by a certain degree during high load impedance in order to obtain the desired image quality. It is highly unlikely that suitable image formation can be achieved using the conventional power device.

In view of the foregoing, it is an object of one aspect of the invention to provide a power device and a power adjusting method capable of easily controlling output when the load impedance is low and obtaining sufficient output when the load impedance is high.

In order to attain the above and other objects, one aspect of the invention provides a power device. The power device includes a transformer, a control signal outputting unit, and a power adjusting unit. The transformer has a primary coil and a secondary coil. The control signal outputting unit variably controls a parameter value and outputs, based on the parameter value, a control signal for controlling output power from the secondary coil. The power adjusting unit receives the control signal from the control signal outputting unit and adjusts power supplied to the primary coil based on the control signal. The power adjusting unit modifies a rate of change within a range in which the parameter value can be variably controlled, the rate of change being a rate of change in the power supplied to the primary coil with respect to the parameter value.

Another aspect of the invention provides a power adjusting method. The power adjusting method includes outputting a control signal for controlling output power from a secondary coil of a transformer based on a parameter value, while variably controlling the parameter value, and adjusting power supplied to a primary coil of the transformer based on the control signal. In the adjusting step, a rate of change is modified within a range in which the parameter value can be variably controlled, the rate of change being a rate of change in the power supplied to the primary coil with respect to the parameter value.

BRIEF DESCRIPTION OF THE DRAWINGS

Illustrative aspects in accordance with the invention will be described in detail with reference to the following figures wherein:

FIG. 4 is a graph showing sample duty-output characteristics in the illustrative aspects;

DETAILED DESCRIPTION

A power device and a power adjusting method according to some aspects of the invention will be described while referring to the accompanying drawings. In the aspects described below, the invention is applied to a high-voltage power device in an electrophotographic image forming apparatus for supplying a high-voltage power to a transfer unit functioning to transfer a developed image formed on the surface of a photosensitive member onto a recording paper or the like.

1. Illustrative Aspects 1.1 Structure and Functional Overview of an Image Forming Apparatus 1

First, the structure and a functional overview of an image forming apparatus 1 according to the illustrative aspects will be described.

Figure 1:
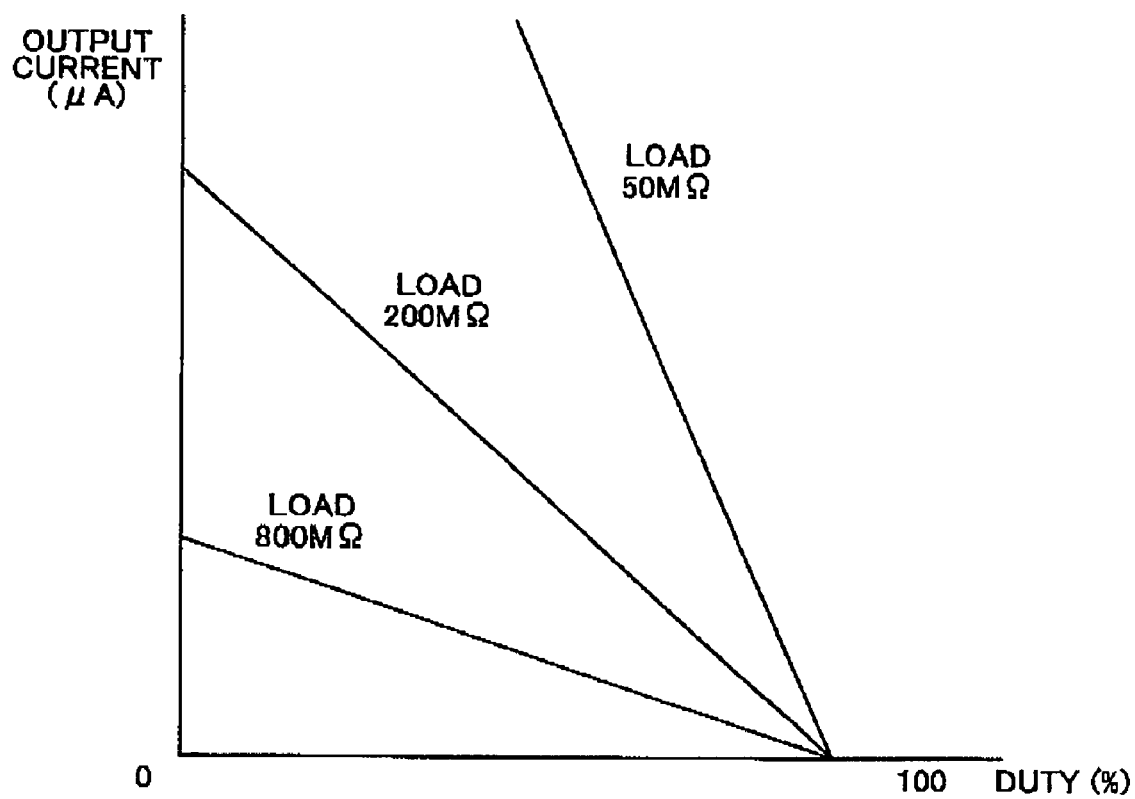
FIG. 1 is a graph showing sample duty-output characteristics in a conventional power device.
Figure 2:
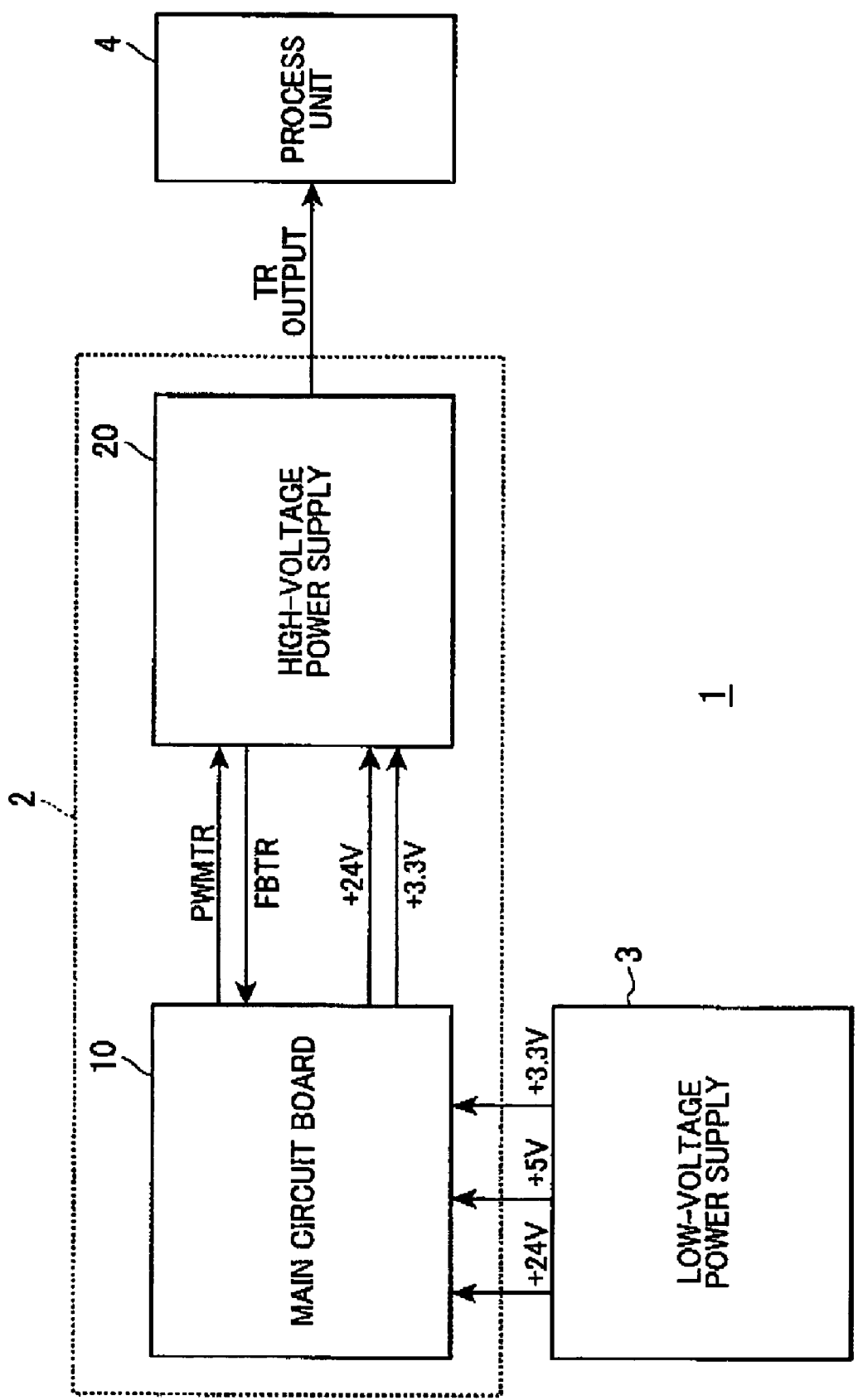
FIG. 2 is a block diagram showing the general structure of an image forming apparatus according to illustrative aspects of the invention.

FIG. 2 is a block diagram showing the overall structure of the image forming apparatus 1 according to the illustrative aspects.

As shown in FIG. 2, the image forming apparatus 1 includes a high-voltage power device 2, a low-voltage power supply 3, and a process unit 4. The high-voltage power device 2 is configured of a main circuit board 10, and a high-voltage power supply 20.

The low-voltage power supply 3 receives power from a commercial power supply (not shown), such as a 100-volt power outlet. The low-voltage power supply 3 functions to supply power to the main circuit board 10 after dividing and transforming the power according to application. For example, the low-voltage power supply 3 can supply 3.3 V for circuit control, 5 V for interfacing, and 24 V for driving a transformer 24 (described later) in the high-voltage power supply 20.

The main circuit board 10 receives power supplied from the low-voltage power supply 3 and controls each component in the image forming apparatus 1. The main circuit board 10 also supplies a PWM signal PWMTR (control signal for controlling power outputted from the high-voltage power supply 20; hereinafter referred to simply as a PWM signal) to the high-voltage power supply 20, and receives a feedback signal FBTR (feedback of output power from the secondary coil side of the transformer 24 in the high-voltage power supply 20; hereinafter referred to simply as a feedback signal) from the high-voltage power supply 20, and varies the duty (duty ratio) of the PWM signal based on this feedback signal.

The high-voltage power supply 20 receives power in 3.3 V and 24 V from the low-voltage power supply 3 via the main circuit board 10, increases the supplied voltage based on the PWM signal supplied from the main circuit board 10, and outputs the increased voltage to the process unit 4. A portion of this output is fed back to the main circuit board 10 as the feedback signal. FIG. 2 only indicates a transfer current (TR output) supplied to a transfer roller of the process unit 4.

The process unit 4 is configured of a photosensitive drum, Scorotron charger, developer cartridge, transfer roller, and the like, for example. The process unit 4 receives high-voltage power supplied from the high-voltage power supply 20 to perform charging, developing, transferring, and other operations.

1.2 Structure and Functional Overview of the High-Voltage Power Device 2

Next, the structure and functions of the high-voltage power device 2 according to the illustrative aspects will be described.

Figure 3:
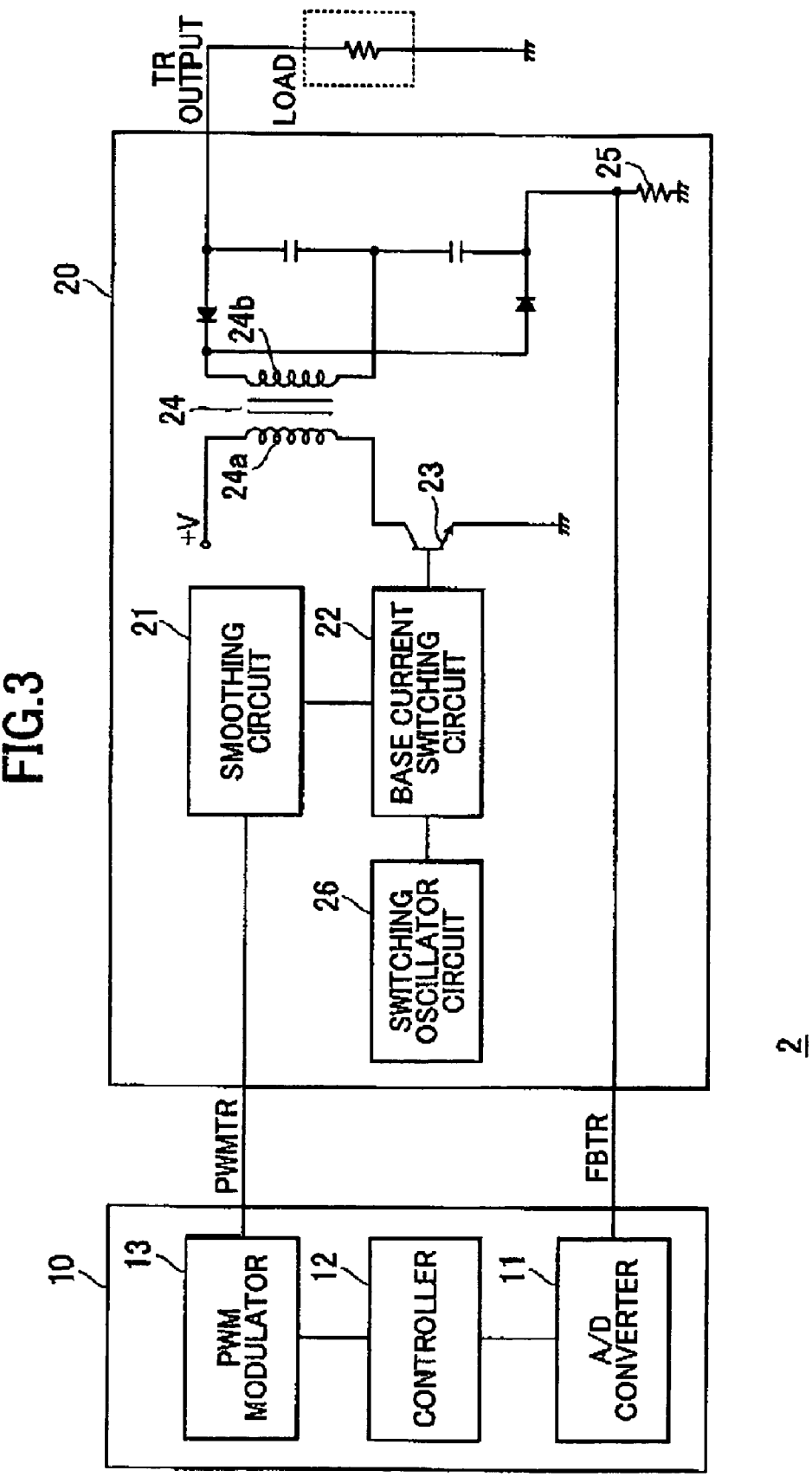
FIG. 3 is a block diagram showing the general structure of a high-voltage power device according to the illustrative aspects.

FIGS. 3 shows the overall structure of the high-voltage power device 2 according to the illustrative aspects, As shown in FIG. 3, the high-voltage power device 2 is broadly configured of the main circuit board 10 and the high-voltage power supply 20.

The main circuit board 10 includes an A/D converter 11, a controller 12, and a PWM modulator 13.

The high-voltage power supply 20 includes a smoothing circuit 21; a base current switching circuit 22; a transistor 23 (switch element); the transformer 24 having a primary coil 24$a$, a secondary coil 24$b$, a rectifier circuit (not shown), and the like; a sensing resistor 25; and a self-excited switching oscillator circuit 26.

Further, the controller 12 and PWM modulator 13 constitute a control signal outputting unit that outputs a PWM signal while adjusting the duty of the signal. The PWM signal serves to control the transfer current outputted from the secondary side of the transformer 24.

The smoothing circuit 21, base current switching circuit 22, and transistor 23 constitute a power adjusting unit which adjusts the electric current supplied to the transformer 24 based on the PWM signal. The power adjusting unit modifies the rate of change in the magnitude of the electric current with respect to the duty within a range in which the duty of the PWM signal can be variably controlled.

The A/D converter 11 receives a portion of the transfer current outputted from the secondary side of the transformer 24 as a feedback signal. The A/D converter 11 converts the portion of the transfer current into a voltage and further converts the voltage into a digital feedback value. The A/D converter 11 supplies this feedback value to the controller 12.

The controller 12 is configured of a CPU (central processing unit), RAM (random access memory), ROM (read only memory), and the like, for example. The CPU reads programs stored in the ROM and the like and executes these programs to set and adjust parameters.

More specifically, the controller 12 adjusts parameters based on the feedback value received from the A/D converter 11 and using an approximate expression of an n-order function for duty (where n is a real number greater than 1) to approximate output characteristics on the secondary side of the transformer 24 with respect to the duty. The controller 12 sets these parameters in the PWM modulator 13. A detailed description of the functions of the controller 12 will be described later.

The PWM modulator 13 generates a PWM signal having a pulse width corresponding to the duty and outputs the PWM signal to the smoothing circuit 21.

The smoothing circuit 21 smoothes the PWM signal and outputs the smoothed analog signal. The voltage of the outputted smoothed signal is of a magnitude corresponding to the duty of the PWM signal (in the illustrative aspects, the voltage of the smoothed signal increases as the duty increases).

The switching oscillator circuit 26 is a self-excited oscillator circuit that outputs switching signals (ON/OFF signals) at a predetermined frequency (70 kHz, for example).

The base current switching circuit 22 generates a smaller base current as the voltage of the smoothed signal outputted from the smoothing circuit 21 becomes larger, and generates a larger base current as the voltage of the smoothed signal becomes smaller. For example, the base current switching circuit 22 generates a base current based on the difference between a predetermined reference voltage and the voltage of the smoothed signal. The base current switching circuit 22 switches the base current according to the switching signal outputted from the switching oscillator circuit 26 and supplies the current to the base of the transistor 23.

Here, the base current switching circuit 22 modifies the rate of change in the magnitude of electric current supplied to the primary coil 24a at a certain duty, so that a first rate of change (in absolute value) when the electric current is larger than the electric current at the certain duty is larger than a second rate of change (in absolute value) when the electric current is smaller than the electric current at the certain duty. The function of the base current switching circuit 22 will be described in greater detail below.

The transistor 23 has a base connected to the base current switching circuit 22, a collector connected to the primary coil 24a, and an emitter connected to ground. The transistor 23 adjusts the magnitude of the electric current supplied to the primary coil 24a according to the current supplied to the base.

The transformer 24 increases the voltage of the power supply based on the ratio of windings in the primary coil 24a and secondary coil 24b, while generating a transfer current in the secondary coil 24b corresponding to the magnitude of current supplied to the primary coil 24a. The transformer 24 rectifies this electric current and supplies the current to the transfer roller in the process unit 4.

The sensing resistor 25 divides the voltage of the transfer current outputted from the secondary side of the transformer 24. As a result, part of the transfer current is fed back and inputted into the A/D converter 11 as the feedback signal.

1.3 Functional Overview of the Base Current Switching Circuit 22

Next, an overview of functions possessed by the base current switching circuit 22 according to the illustrative aspects will be described with reference to FIG. 4

FIG. 4 is a graph showing an example of duty-output characteristics according to the illustrative aspects. In this graph, a horizontal axis indicates duty (%) of a PWM signal, while a vertical axis indicates the transfer current (output current) in micro ampere. Note that 1) the base current supplied to the base of the transistor 23, 2) the current supplied to the primary coil 24a, and 3) the transfer current outputted from the secondary side of the transformer 24 have substantially the same characteristics. Accordingly, although the transfer current (output current) is shown in FIG. 4, the base current and the current supplied to the primary coil 24a have substantially the same characteristics as that shown in FIG. 4.

As shown in FIG. 4, the transfer current outputted from the secondary side of the transformer 24 increases as the duty decreases. Further, the base current switching circuit 22 modifies the rate of change in the base current to a higher rate (in absolute value) when the duty is below a certain value X than when the duty is above the value X. In other words, the base current switching circuit 22 modifies the rate of change in the base current at the duty X, such that the rate of change (in absolute value) is larger when the duty is lower than X than when the duty is higher than X. Accordingly, the rate of change in the current supplied to the primary coil 24a is larger when the duty is lower than X than when the duty is higher than X. Further, the rate of change in the transfer current is larger when the duty is lower than X than when the duty is higher than X. Thus, the rate of change in the transfer current (output current) when the transfer current is larger than the transfer current at the duty X is greater than the rate of change when the transfer current is smaller than the transfer current at the duty X. Note that the rate of change is indicated by the slope of each line in FIG. 4.

The duty X at which the rate of change is modified is determined based on characteristics of the transformer and the like. However, the value X must be set at least in a range within which the duty of the PWM signal can be variably controlled.

The variable range for the duty is a range in which the controller 12 can control the transfer current outputted from the secondary side of the transformer 24 by varying the duty.

More specifically, when the duty is greater than a in the example shown in FIG. 4, the transfer current is 0 A (ampere) and, hence, cannot be controlled. Accordingly, a is the upper limit of the variable range for the duty.

Further, the maximum value of the transfer current outputted from the secondary side of the transformer 24 is determined by the power supplied to the primary coil 24a and the ratio of windings in the primary coil 24a and secondary coil 24b. Naturally, it is not possible to obtain power output greater than this maximum value when the load impedance is high, such as 800 MΩ, the transfer current is low and, hence, the duty can be adjusted in a range down to 0%. However, when the load impedance is low, such as 50 MΩ, the duty will reach a value, at some point, below which the transfer current exceeds a maximum value and thus cannot be controlled, Therefore, a lower limit of the variable range for the duty is determined based on the range of load for which power supply is targeted.

The duty X is determined (or selected) within this variable range in this way. The base current switching circuit 22 is configured to modify the rate of change in the base current at a voltage in the smoothed signal corresponding to the duty X. In other words, the rate of change in the base current are different between both sides of the duty X (that is, between duty smaller than x and duty greater than x).

1.4 Functional Overview of the Controller 12

Next, an overview of functions possessed by the controller 12 according to the illustrative aspects will be described with reference to FIGS. 5A and 6.

Figure 5A:
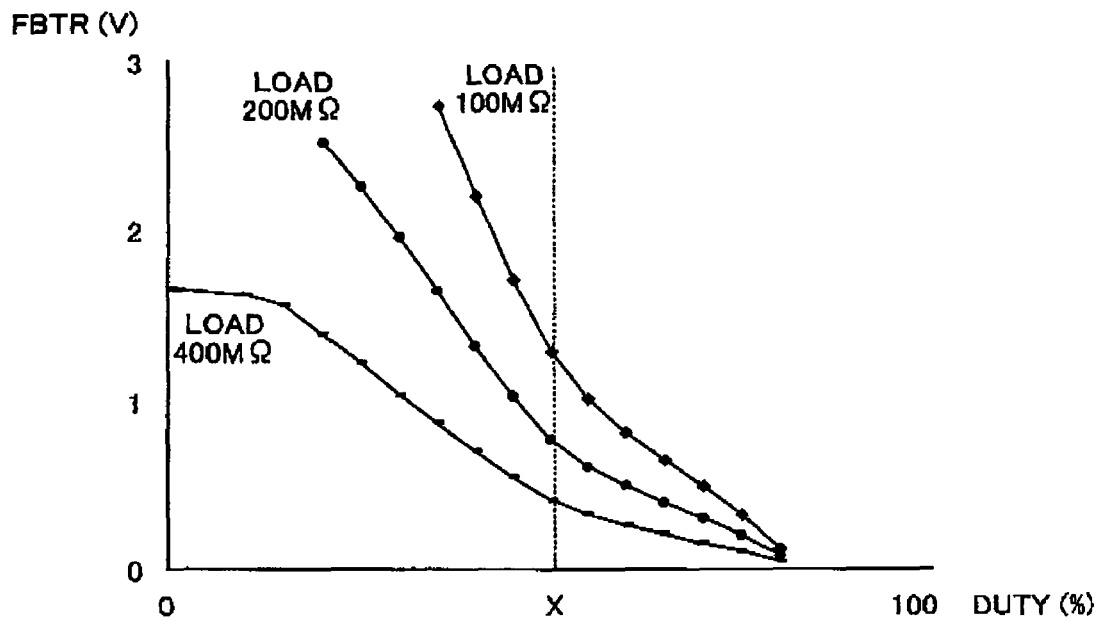
FIG. 5A is a graph showing sample measured values of duty-feedback characteristics in the illustrative aspects.
Figure 5B:
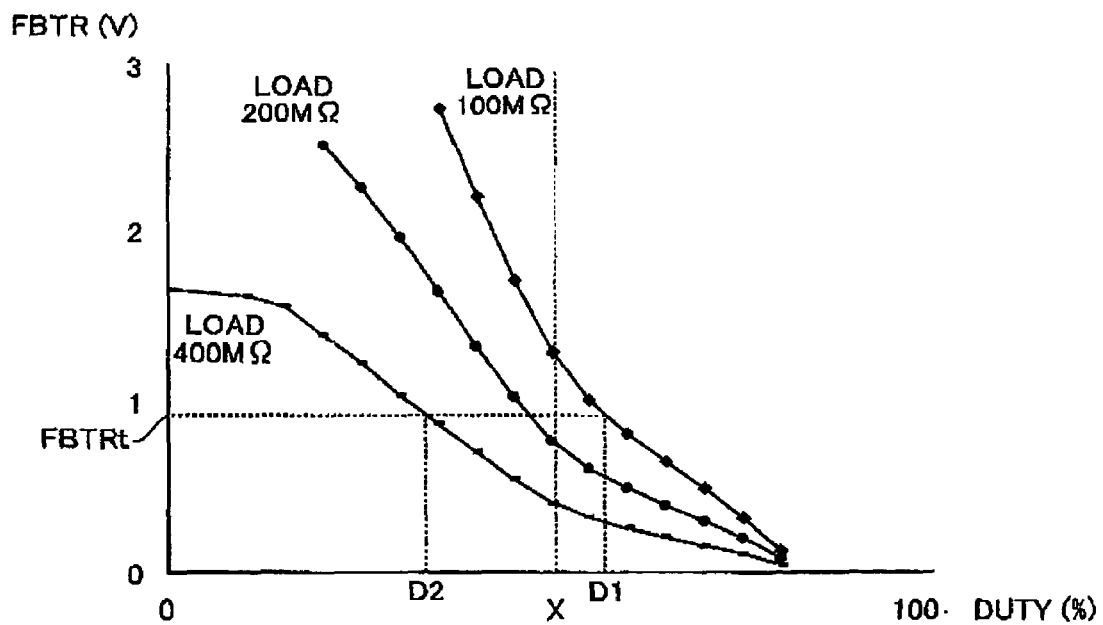
FIG. 5B is a graph that corresponds to FIG. 5A and additionally shows relationships between a target feedback value and duty values for different load impedances.

FIG. 5A is a graph showing sample measured values for the duty-feedback characteristics according to the illustrative aspects. FIG. 5B is a graph that corresponds to FIG. 5A and that additionally shows relationships between a target feedback value and duty values for different load impedances. FIG. 6 is a graph showing approximation curves superimposed over the measured values of duty-feedback characteristics.

As described above, the controller 12 substitutes both a feedback value received from the A/D converter 11 and a duty currently set in the PWM modulator 13 into an approximation expression described later, thereby calculating a new duty for obtaining a target transfer current from the secondary side of the transformer 24. The controller 12 sets this new duty in the PWM modulator 13. In this way, the controller 12 can variably control the duty.

When the high-voltage power device 2 is configured as described above, the duty-output characteristics of the high-voltage power device 2 ideally exhibits a bent line having the duty X as its vertex, as shown in FIG. 4.

However, when actually varying the duty and measuring the feedback value of the transfer current outputted from the secondary side, the duty-output characteristics is close to a parabola, as shown in FIG. 5A.

At this time, the feedback value FBTR can be expressed by the following approximation expression for approximating these characteristics.

$$FBTR = K1(\text{Duty} - a)^n \quad \text{(Equation 1)}$$

In Equation 1, K1 is a coefficient: Duty is the duty of the PWM signal; a is the duty at which the transfer current reaches 0 A in FIG. 4; and n is the order obtained from the duty-feedback characteristics.

Hence, the duty-feedback characteristics can be represented by an n-order function of the duty (where n is a real number greater than 1). For example, a quadratic function (i.e., n=2) can be used. However, other values of n can also be used depending on characteristics of the high-voltage power device 2 (duty-output characteristics).

Figure 6:
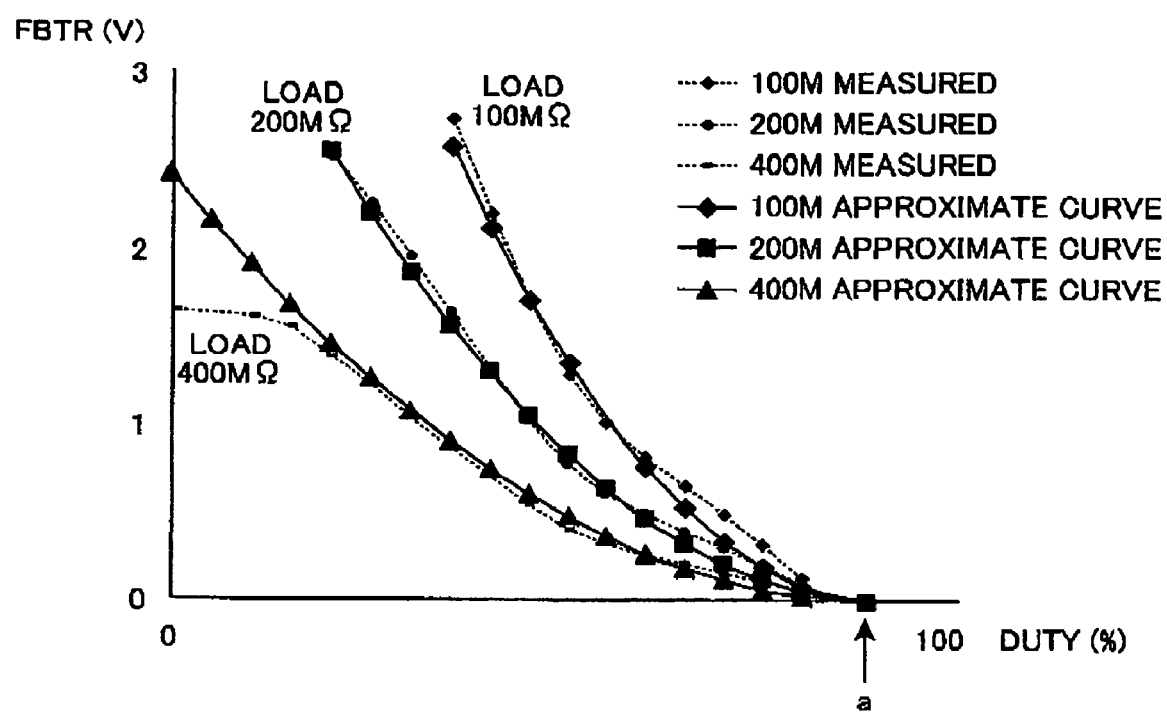
FIG. 6 is a graph showing approximation curves superimposed over the measured values of duty-feedback characteristics in FIG. 5A.

FIG. 6 shows the curves expressed by Equation 1 superimposed over the measured values of duty-feedback characteristics shown in FIG. 5A. As shown in FIG. 6, a degree of slope of the curve changes according to the amount of load. The degree of slope is expressed by the coefficient K1.

Therefore, after reading the feedback value supplied from the A/D converter 11, the controller 12 substitutes this feedback value and the duty Duty set in the PWM modulator 13 in the following equation derived from Equation 1 to find the coefficient K1.

$$K1 = \frac{FBTR}{(\text{Duty} - a)^n} \quad \text{(Equation 2)}$$

In this way, the coefficient K1 that fits the current load impedance can be determined.

The controller 12 inserts the coefficient K1 found above and a target feedback value FBTRt into the following equation derived from Equation 1 to find a target duty Dutyt.

$$Dutyt = \sqrt[n]{\frac{FBTRt}{K1}} + a \quad \text{(Equation 3)}$$

The controller 12 sets the duty Dutyt derived above in the PWM modulator 13.

1.5 Operations of the High-Voltage Power Device 2

Next, operations of the high-voltage power device 2 according to the illustrative aspects will be described.

The A/D converter 11 receives the inputted feedback signal of the transfer current, converts the analog signal to digital, and supplies the digital signal to the controller 12 as the feedback signal.

The controller 12 reads the feedback signal supplied from the A/D converter 11 at predetermined intervals, calculates the duty Dutyt using Equations 2 and 3, and sets the duty in the PWM modulator 13. Detailed operations of the controller 12 are described below.

Next, the PWM modulator 13 generates a PWM signal at the established duty and outputs the PWM signal to the smoothing circuit 21. The smoothing circuit 21 receives this outputted signal and outputs a smoothed signal corresponding to the duty.

Next, the base current switching circuit 22 modifies the rate of change in the magnitude of the base current to be smaller when the voltage of the smoothed signal is a magnitude corresponding to a duty greater than x and to be greater when the voltage of the smoothed signal is a magnitude corresponding to a duty less than X. At the same time, the base current switching circuit 22 generates a smaller base current when the voltage of the smoothed signal is greater, and generates a larger base current when the voltage of the smoothed signal is smaller. The base current switching circuit 22 switches the base current based on a switching signal outputted from the switching oscillator circuit 26 and supplies the current to the transistor 23.

The transistor 23 adjusts the magnitude of the electric current supplied to the primary coil 24a of the transformer 24 based on the magnitude of the base current received from the base current switching circuit 22.

In this way, the smoothing circuit 21, base current switching circuit 22, and transistor 23 adjust the current supplied to the primary coil 24a based on the PWM signal serving as a control signal. The smoothing circuit 21, base current switching circuit 22, and transistor 23 modify the rate of change in magnitude of the current supplied to the primary coil 24a with respect to the duty of the PWM signal at a certain duty within a range in which the duty can be variably controlled.

The transformer 24 generates a transfer current in the secondary coil 24b based on the magnitude of the electric current supplied to the primary coil 24a, rectifies this transfer current, and supplies the current to the process unit 4. A portion of the electric current is also inputted into the A/D converter 11 as the feedback signal by the sensing resistor 25.

In this way, the transfer current outputted from the secondary side of the transformer 24 exhibits characteristics such as those shown in FIG. 5A. Accordingly, the high-voltage power device 2 can easily control output when the load impedance is low by improving the resolution in the duty range above the value X, and can obtain sufficient output within the duty range below the value X when the load impedance is high. For example, assume that a target feedback value FBTRt is set as shown in the graph of FIG. 5B. In this example, a duty D1 (greater than X) is used if the load impedance is 100 MΩ, and a duty D2 (smaller than X) is used if the load impedance is 400 MΩ.

1.6 Operations of the Controller 12

Next, the operations of the controller 12 according to the illustrative aspects will be described with reference to FIGS. 7 and 8.

Figure 7:
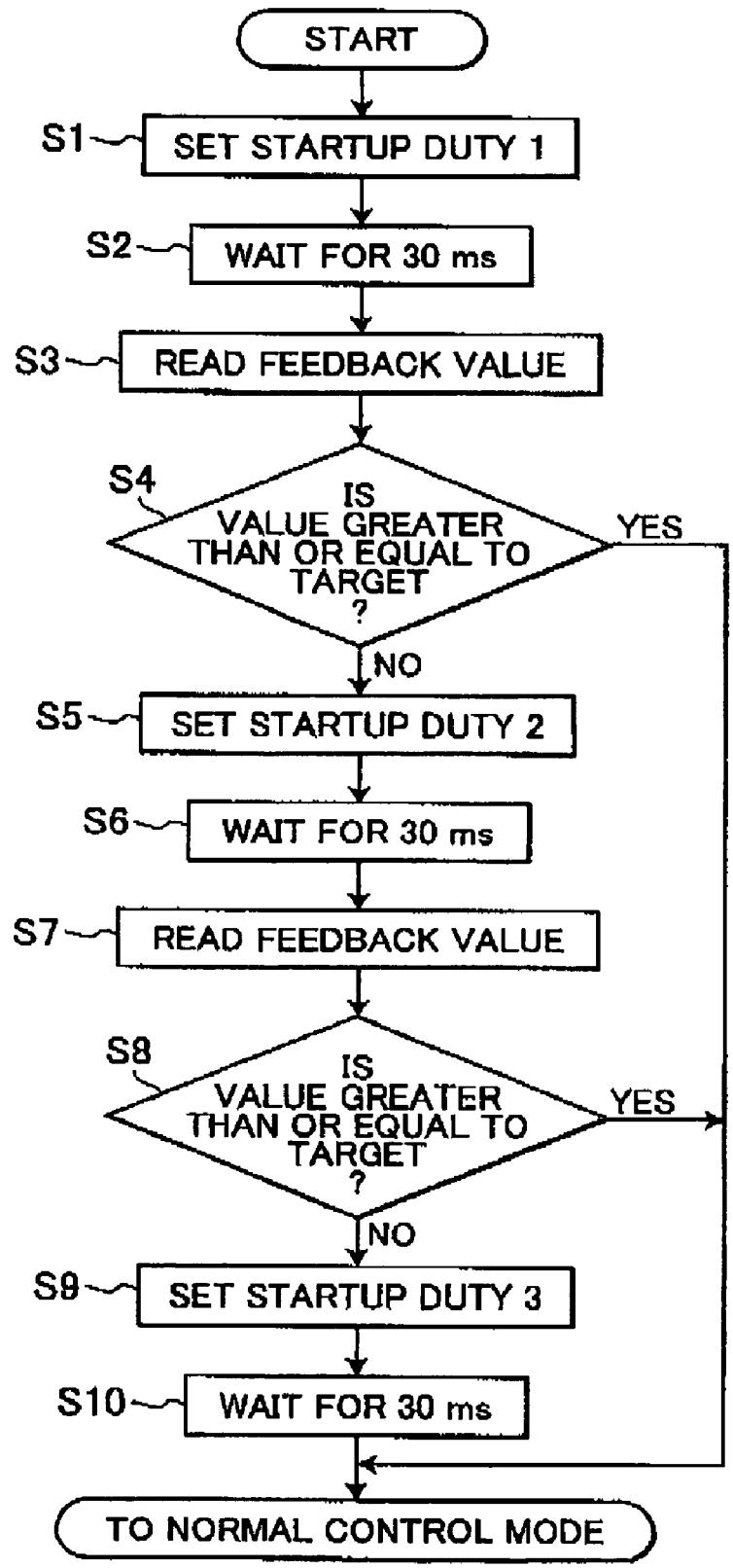
FIG. 7 is a flowchart illustrating steps in a process executed by a controller in a startup mode according to the illustrative aspects.

FIG. 7 is a flowchart showing steps in a process executed by the controller 12 in a startup mode according to the illustrative aspects. FIG. 8 is a flowchart illustrating steps in a process executed by the controller 12 in a normal control mode according to the illustrative aspects.

When a power switch (not shown) provided on the image forming apparatus 1 is switched on, the high-voltage power device 2 receives a power supply from the low-voltage power supply 3. At the beginning of a printing operation, the controller 12 operates in a startup mode for setting the duty in three stages. Steps in the process of the startup mode are shown in FIG. 7. Since there is a danger of overshooting the target output from the secondary side of the transformer if the power supply is immediately raised to a level for achieving the target output, the output is raised gradually in the illustrative aspects until the target transfer current is obtained.

Specifically, in Step 1 (hereinafter is abbreviated as "S") of FIG. 7, the controller 12 initially sets startup duty 1 (first startup duty) for a low output in the PWM modulator 13. After waiting for 30 ms in S2, the controller 12 reads the feedback value of the transfer current in S3 and determines in S4 whether the feedback value is greater than or equal to the target value.

If the feedback value is greater than or equal to the target value (S4: YES), then the controller 12 shifts into the normal control mode. However, if the target value has not been reached (S4: NO), then in S5 the controller 12 sets startup duty 2 (second startup duty) for a higher output than the startup duty 1 in the PWM modulator 13.

Steps S6-S8 are identical to S2-S4. In other words, if the feedback value has not reached the target value (SO: NO), then in S9 the controller 12 sets startup duty 3 (third startup duty) for an even higher output in the PWM modulator 13. After waiting for 30 ms in S10, the controller 12 shifts into the normal control mode.

Figure 8:
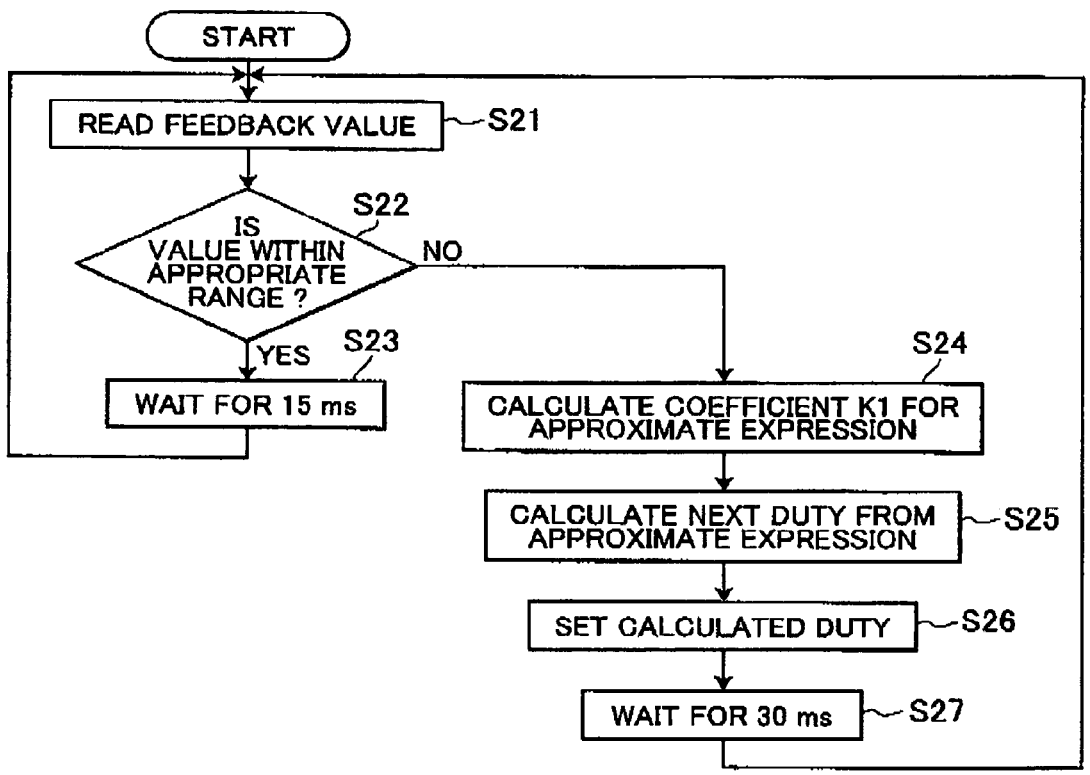
FIG. 8 is a flowchart illustrating steps in a process executed by a controller in a normal control mode according to the illustrative aspects.

Upon entering the normal control mode, as shown in FIG. 8, the controller 12 reads the feedback value in S21, and determines in S22 whether the difference between the feedback value and a target feedback value for performing a suitable transfer falls within an appropriate range.

If this difference falls within the appropriate range, then in S23 the controller 12 waits for 15 ms before returning to S21 and repeating the process of reading and comparing the feedback value.

However, if the difference does not fall within the appropriate range, then in S24 the controller 12 calculates the coefficient K1 from the feedback value and the duty currently set in the PWM modulator 13 using Equation 2.

In S25 the controller 12 calculates a desirable duty from the coefficient K1 and the target feedback value using Equation 3.

In S26 the controller 12 sets the duty found above in the PWM modulator 13 and waits for 30 ms in S27 before returning to S21.

In the illustrative aspects described above, the PWM modulator 13 outputs a PWM signal at a duty that is continuously adjusted by the controller 12. The smoothing circuit 21, base current switching circuit 22, and transistor 23 adjust the current supplied to the primary coil 24a based on this PWM signal and modify, at a certain duty within a range in which duty can be variably controlled, the rate of change in the magnitude of electric current supplied to the primary coil 24a with respect to the duty. Therefore, the high-voltage power device 2 can modify the rate of change to improve the resolution of the transfer current outputted from the secondary side of the transformer 24 with respect to the duty, thereby easily controlling output when the load impedance is low. At the same time, the high-voltage power device 2 can modify the rate of change to increase output, thereby obtaining sufficient output when the load impedance is high.

Based on the smoothed signal outputted from the smoothing circuit 21, the base current switching circuit 22 changes the rate of change in electric current supplied to the primary coil 24a at a duty value of X, such that the rate of change (in absolute values) is larger for duty less than X than the rate of change for duty greater than X. Hence, the high-voltage power device 2 can easily control output when the load impedance is low by reducing the rate of change in the magnitude of the transfer current outputted from the secondary side of the transformer 24 for the range of duty greater than X, and can obtain a sufficient output when the load impedance is high by increasing the rate of change in the transfer current outputted from the secondary side of the transformer 24 for the range of duty below X.

The controller 12 also controls the duty using an n-order function of duty that approximates the duty-output characteristics (Equation 1) based on the feedback value of the transfer current fed back by the sensing resistor 25. The PWM modulator 13 generates a PWM signal at the duty controlled by the controller 12. Therefore, the high-voltage power device 2 can perform accurate feedback control based on duty-output characteristics that resemble a parabola.

2. Additional Aspects 2.1 Structure and Functional Overview of the High-Voltage Power Device 2

Next, the high-voltage power device 2 according to additional aspects of the invention will be described.

In the illustrative aspects described above, the high-voltage power device 2 controls the duty of the PWM signal using a single approximate expression for the entire adjustable range of the duty. However, in the additional aspects described below, the high-voltage power device 2 controls the duty using different approximate expressions for different ranges of duty.

Figure 9:
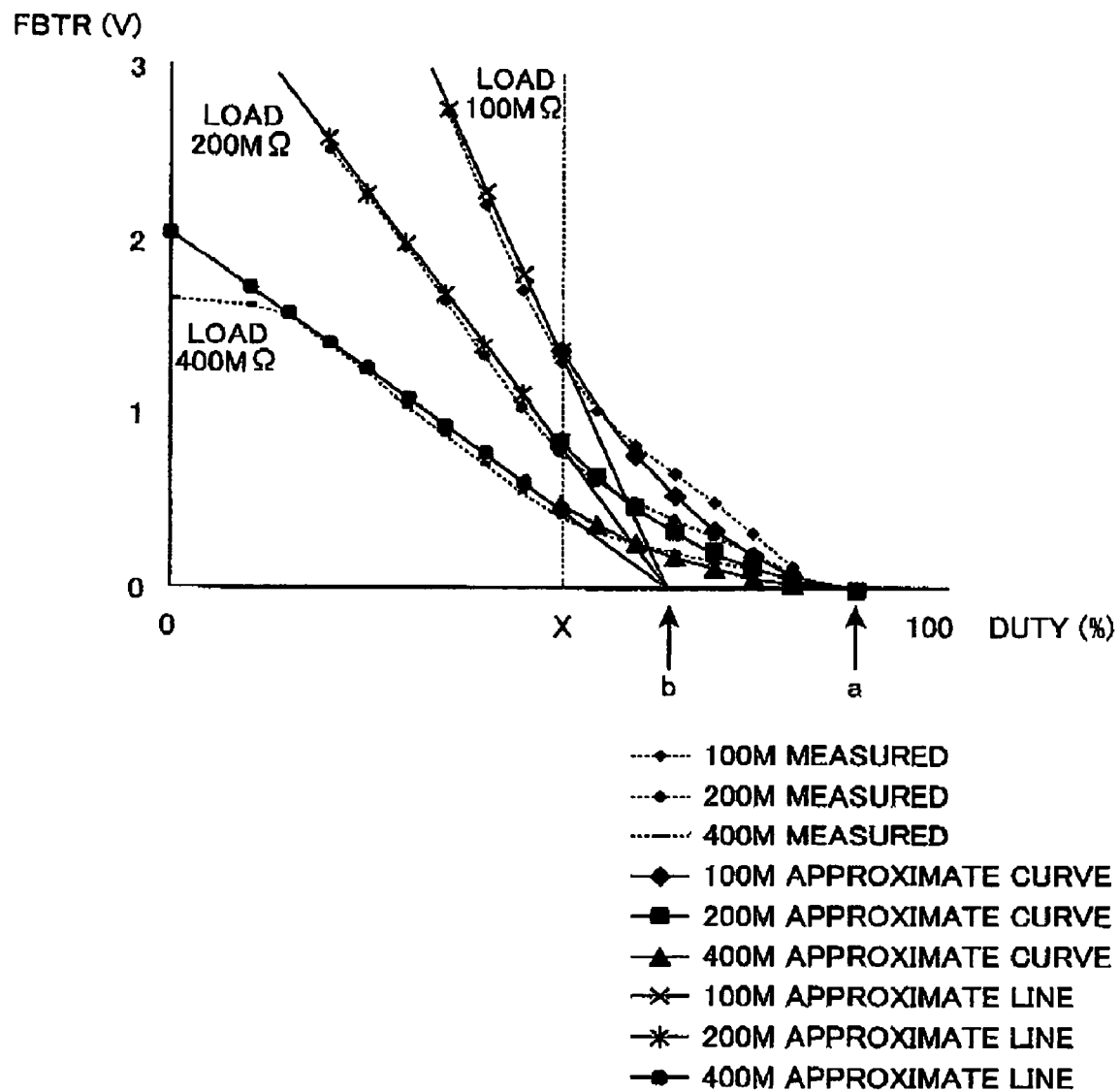
FIG. 9 is a graph showing two approximations (one approximate curve and one approximate line for each load) superimposed over the measured values of duty-feedback characteristics according to additional aspects.

FIG. 9 is a graph showing two approximations (one approximate curve and one approximate line for each load) superimposed over measured values of the duty-feedback characteristics according to the additional aspects.

When the high-voltage power device 2 is configured to change the rate of change in the magnitude of electric current supplied to the primary coil 24a at the duty X, the degree of slope of feedback characteristics changes between both sides of the duty X.

Therefore, feedback control can be performed more accurately by controlling the duty using different approximate expressions for the ranges of duty above and below X that are suited to characteristics in these ranges.

In the additional aspects, the high-voltage power device 2 uses Equations 2 and 3 derived from Equation 1, as in the above-described illustrative aspects, for approximating the characteristics of a parabola in the range of duty above X, since the feedback characteristics exhibit a curve. However, the high-voltage power device 2 of the additional aspects uses a linear equation for the range of duty below X, since the feedback characteristics in this range show linearity.

When the feedback characteristics exhibit linearity, these characteristics can be represented by a linear equation.

$$FBTR = -\frac{K2}{b}\text{Duty} + K2 \qquad \text{(Equation 4)}$$

In Equation 4, K2 is a coefficient, and b is the duty at which the electric current reaches 0 A in FIG. 9 when the approximate line expressed by Equation 4 is extended into the range of duty above X.

As shown in FIG. 9, the slope of the line changes according to load. This slope is expressed by K2.

Therefore, when the duty that is currently set in the PWM modulator 13 is below X, the coefficient K2 is calculated using the following equation derived from Equation 4.

$$K2 = \frac{b \cdot FBTR}{b - \text{Duty}} \qquad \text{(Equation 5)}$$

Next, a target duty Dutyt is calculated using the following equation derived from Equation 4.

$$Duty_t = b\left(1 - \frac{FBTR_t}{K2}\right) \quad \text{(Equation 6)}$$

By using different approximate expressions for the ranges divided by the duty X in this way, it is possible to use not only an approximate expression for a parabola, but also a linear approximation or another curvilinear approximation based on the characteristics of each range.

The combinations of approximate expressions need not be combinations for a curve and a line, as described above, but may be combinations of approximate expressions for two curves or approximate expressions for two lines, as well.

2.2 Operations of the Controller 12

Figure 10:
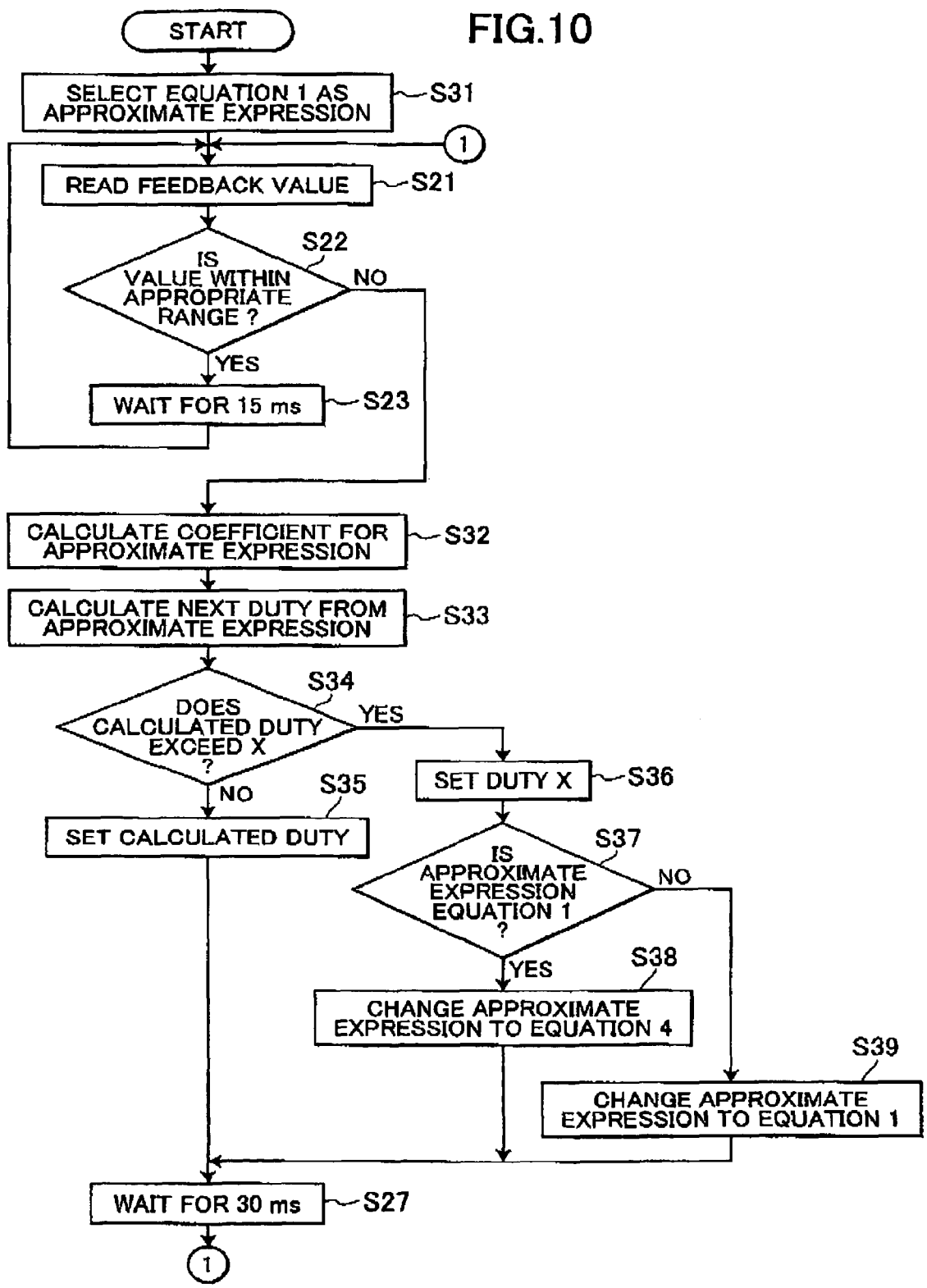
FIG. 10 is a flowchart illustrating steps in a process executed by a controller in a normal control mode according to the additional aspects.

Next, the operations of the controller 12, according to the additional aspects will be described with reference to FIG. 10. FIG. 10 is a flowchart illustrating steps in a process executed by the controller 12 in the normal control mode according to the additional aspects, wherein similar steps to the process described in FIG. 8 are labeled with the same step number.

In S31 of FIG. 10, the controller 12 selects Equation 1, for example, as the approximate expression for calculating the duty. Here, the controller 12 selects Equation 1 when the startup duty set in the startup mode is greater than or equal to X, or selects Equation 4 when the startup duty is less than X.

If the feedback value read in S21 does not fall within the appropriate range (S22: NO), then the controller 12 advances to S32.

In S32 the controller 12 calculates the coefficient K1 or K2 from the feedback value and the duty currently set in the PWM modulator 13 using an equation derived from the selected approximate expression. In S33 the controller 12 calculates next duty based on this coefficient and the target feedback value.

In S34 the controller 12 determines whether the duty calculated based on the currently set duty exceeds the value X. For example, if the value X is 50%, the currently set duty is 40%, and the calculated duty is 60%, then the calculated duty is found to exceed the value X. Conversely, if the currently set duty is 60% and the calculated duty is 40%, then the calculated duty is also determined to exceed X.

If the calculated duty exceeds the value X, then the next duty cannot be accurately calculated using the currently selected approximate expression. In such a case, the duty X is temporarily set in the PWM modulator 13, and the approximate expression is changed.

Specifically, if the calculated duty does not exceed X (S34: NO), then in S35 the controller 12 sets the calculated duty in the PWM modulator 13 and advances to S27. However, if the calculated duty exceeds the value X (S34: YES), then in S36 the controller 12 sets the duty X in the PWM modulator 13 and advances to S37.

In S37 the controller 12 determines whether the currently selected approximate expression is Equation 1. If the approximate expression is Equation 1 (S37: YES), then in S38 the controller 12 changes the approximate expression to Equation 4. However, if the current approximate expression is not Equation 1 (S37; NO), then in S39 the controller 12 changes the approximate expression to Equation 1.

This process enables the controller 12 to calculate a desirable duty using the new approximate expression the next time.

In addition to the effects obtained in the illustrative aspects, the controller 12 in the additional aspects switches the approximate expression used to approximate the duty-output characteristics at the duty X based on a feedback signal of the transfer current received from the sensing resistor 25, thereby controlling the parameter (duty value) using an approximate expression which fits the duty-output characteristics of each range. Therefore, the PWM modulator 13 can generate a PWM signal based on this controlled duty to achieve more accurate feedback control.

While the invention has been described in detail with reference to the above aspects thereof, it would be apparent to those skilled in the art that various changes and modifications may be made therein without departing from the spirit of the invention.

In the aspects described above, the rate of change in the magnitude of electric current supplied to the primary coil 24a is changed at only one duty position (i.e., at the duty X). However, this rate of change may be changed at a plurality of positions.

Further, in the aspects described above, a PWM signal is used as the control signal and a duty as the parameter, whereby the PWM signal outputted at the variable duty is smoothed and supplied to the base current switching circuit 22. However, the control signal may be other types of signals, and the parameter may be other types of parameters.

Further, in the aspects described above, the base current switching circuit 22 generates a smaller base current as the voltage of the smoothed signal outputted from the smoothing circuit 21 becomes larger, and generates a larger base current as the voltage of the smoothed signal becomes smaller (negative characteristics). However, the base current switching circuit 22 may generate a larger base current as the voltage of the smoothed signal outputted from the smoothing circuit 21 becomes larger, and may generate a smaller base current as the voltage of the smoothed signal becomes smaller (positive characteristics). This depends on circuit configuration.

What is claimed is:

1. A power device comprising:
   a transformer having a primary coil and a secondary coil;
   a control signal outputting unit that variably controls a parameter value and that outputs, based on the parameter value, a control signal for controlling output power from the secondary coil; and
   a power adjusting unit that is configured to receive the control signal from the control signal outputting unit and is configure to adjust power supplied to the primary coil based on the control signal such that the power adjusting unit is configured to modify a rate of change within a range in which the parameter value can be variably controlled, the rate of change being a rate of change in the power supplied to the primary coil with respect to the parameter value.

2. The power device according to claim 1, wherein the power adjusting unit modifies the rate of change at a certain parameter value in such a manner that a first rate of change in absolute value is larger than a second rate of change in absolute value, the first rate of change is a rate of change when the output power is larger than the output power at the certain parameter value, the second rate of change is a rate of change when the output power is smaller than the output power at the certain parameter value.

3. The power device according to claim 2, further comprising a feedback unit that feeds back the output power as either one of an output voltage and an output current, thereby generating a feedback signal, wherein the control signal outputting unit comprises:
   a parameter controlling unit that controls the parameter value based on the feedback signal using at least one approximate expression and that outputs the parameter value, the at least one approximate expression being for approximating characteristics of the output power with respect to the parameter value; and a control signal generating unit that generates the control signal based on the parameter value outputted from the parameter controlling unit.

4. The power device according to claim 3, wherein the at least one approximate expression includes an n-order expression of the parameter value, where a number n is a real number greater than one.

5. The power device according to claim 4, wherein the control signal outputting unit variably controls duty of a pulse width modulation signal and that outputs the pulse width modulation signal as the control signal; and wherein the n-order expression is represented by an expression $$FBTR = K1(\text{Duty} - a)^n$$

where FBTR is a feedback value of the output power, K1 is a coefficient which depends on a load to which the output power is supplied, Duty is the duty of the pulse width modulation signal, a is the duty at which the output power becomes zero, and the number n is obtained from duty-feedback characteristics between the duty and the feedback value.

6. The power device according to claim 4, wherein the number n is two.

7. The power device according to claim 3, wherein the at least one approximate expression includes a plurality of approximate expressions; and wherein the parameter controlling unit changes the approximate expressions when the parameter value exceeds the certain parameter value.

8. The power device according to claim 7, wherein the plurality of approximate expressions includes a parabola expression and a linear expression.

9. The power device according to claim 1, wherein the control signal outputting unit variably controls duty of a pulse width modulation signal and that outputs the pulse width modulation signal as the control signal; and wherein the power adjusting unit comprises:
a switch element connected to the primary coil;
a smoothing unit that smoothes the pulse width modulation signal outputted from the control signal outputting unit and that outputs a smoothed signal; and
an adjusted power supplying unit that supplies power to the switch element based on the smoothed signal, the adjusted power supplying unit being configured to modify the rate of change at a certain duty in such a manner that a first rate of change in absolute value is larger than a second rate of change in absolute value, the first rate of change is a rate of change when the output power is larger than the output power at the certain duty, the second rate of change is a rate of change when the output power is smaller than the output power at the certain duty.

10. A power adjusting method comprising:
outputting a control signal for controlling output power from a secondary coil of a transformer based on a parameter value, while variably controlling the parameter value; and adjusting power supplied to a primary coil of the transformer based on the control signal such that a rate of change is modified within the parameter value can be variably controlled, the rate of change being a rate of change in the power supplied to the primary coil with respect to the parameter value.

11. The power adjusting method according to claim 10, wherein adjusting power supplied to the primary coil further comprises:
modifying the rate of change at a certain parameter value in such a manner that a first rate of change in absolute value is larger than a second rate of change in absolute value, the first rate of change in absolute value is change when the power is larger than the output power at the certain parameter value, the second rate of change is a rate of change when the output is smaller than the output power at the certain parameter value.

12. The power device according to claim 11, further comprising:
feeding back the output power as either one of an output voltage and an output current, thereby generating a feedback signal;
controlling the parameter value based on the feedback signal using at least one approximate expression and that outputs the parameter value, the at least one approximate expression being for approximating characteristics of the output power with respect to the parameter value; and
generating the control signal based on the parameter value output power from the parameter controlling unit.

* * * * *